(12) United States Patent
Shibata

(10) Patent No.: US 9,397,756 B2
(45) Date of Patent: Jul. 19, 2016

(54) OPTICAL RECEIVER

(71) Applicant: FUJITSU OPTICAL COMPONENTS LIMITED, Kawasaki-shi, Kanagawa (JP)

(72) Inventor: Kohei Shibata, Isehara (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 14/454,781

(22) Filed: Aug. 8, 2014

(65) Prior Publication Data

US 2014/0348517 A1 Nov. 27, 2014

Related U.S. Application Data

(63) Continuation of application No. PCT/JP2012/055144, filed on Feb. 29, 2012.

(51) Int. Cl.
- *H04B 10/61* (2013.01)
- *G02B 6/42* (2006.01)
- *G02B 6/43* (2006.01)

(52) U.S. Cl.
CPC ............ *H04B 10/61* (2013.01); *G02B 6/4222* (2013.01); *G02B 6/4249* (2013.01); *G02B 6/4286* (2013.01); *G02B 6/43* (2013.01)

(58) Field of Classification Search
None
See application file for complete search history.

(56) References Cited

U.S. PATENT DOCUMENTS

| | | | |
|---|---|---|---|
| 2008/0145066 A1 | 6/2008 | Hoshida | |
| 2010/0111544 A1 | 5/2010 | Oda et al. | |

FOREIGN PATENT DOCUMENTS

| | | |
|---|---|---|
| JP | 2004-303943 | 10/2004 |
| JP | 2008-153863 | 7/2008 |
| JP | 2010-109847 | 5/2010 |
| JP | 2011-175133 | 9/2011 |
| JP | 2011-193347 | 9/2011 |
| JP | 2011-203377 | 10/2011 |

OTHER PUBLICATIONS

Patent Abstracts of Japan, Publication No. 2004-303943, published Oct. 28, 2004.
Patent Abstracts of Japan, Publication No. 2008-153863, published Jul. 3, 2008.
Patent Abstracts of Japan, Publication No. 2010-109847, published May 13, 2010.
Patent Abstracts of Japan, Publication No. 2011-175133, published Sep. 8, 2011.

(Continued)

*Primary Examiner* — Darren E Wolf
(74) *Attorney, Agent, or Firm* — Staas & Halsey LLP

(57) ABSTRACT

An optical receiver including a waveguide substrate including a first waveguide that transmits a main signal beam, a second waveguide that transmits a monitoring beam that has branched from the main signal beam, and a third waveguide that transmits an amplification beam to amplify the main signal beam; a light receiving device array including, integrally formed to the same substrate, a first light receiving device that detects the main signal beam and a second light receiving device that detects the monitoring beam; and a case that houses the waveguide substrate and the light receiving device array. The first light receiving device faces toward an end of the first waveguide, and the second light receiving device faces toward an end of the second waveguide.

8 Claims, 14 Drawing Sheets

(56) References Cited

OTHER PUBLICATIONS

Patent Abstracts of Japan, Publication No. 2011-193347, published Sep. 29, 2011.
Patent Abstracts of Japan, Publication No. 2011-203377, published Oct. 13, 2011.
International Search Report mailed May 1, 2012, in corresponding International Patent Application No. PCT/JP2012/055144.
Japanese Office Action dated Jul. 14, 2015 in corresponding Japanese Patent Application No. 2014-501904.

OPTICAL RECEIVER

CROSS-REFERENCE TO RELATED APPLICATION

This application is a continuation application of International Application No. PCT/JP2012/055144, filed Feb. 29, 2012, the disclosure of which is incorporated herein by reference in its entirety.

FIELD

The embodiments discussed herein are related to an optical receiver.

BACKGROUND

There is a proposal for an optical receiver that has plural light receiving devices installed inside a sealed container (see, for example, Japanese Patent Application Laid-Open (JP-A) No. 2011-175133).

In optical transmission, there is recently demand, in optical receivers that split a received beam and receive the light with plural light receiving devices, for a function to detect signal interruptions, and to monitor the intensity of optical phase modulated signals input as a parameter in demodulation. There is accordingly a demand to provide inside the housing of the optical receiver both light receiving devices that measure the input main signal beam, and a light receiving device that measures a monitoring beam. It is desirable in such cases to achieve a configuration enabling good positional alignment to be attained for the light receiving device that measures the monitoring beam.

SUMMARY

According to an aspect of the embodiments, an optical receiver includes: a waveguide substrate including a first waveguide that transmits a main signal beam, a second waveguide that transmits a monitoring beam that has branched from the main signal beam, and a third waveguide that transmits an amplification beam to amplify the main signal beam; a light receiving device array including, integrally formed to the same substrate, a first light receiving device that detects the main signal beam and a second light receiving device that detects the monitoring beam; and a case that houses the waveguide substrate and the light receiving device array; wherein the first light receiving device faces toward an end of the first waveguide, and the second light receiving device faces toward an end of the second waveguide.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Explanation next follows regarding preferable exemplary embodiments of the technology disclosed herein.

In optical transmission systems, attention has recently been drawn to methods of optical phase modulation as methods to implement large capacities with low deterioration during transmission. From out of these, in particular Dual Polarization Differential Quadrature Phase Shift Keying (DP-QPSK) is progressing with standardization through the Optical Internetworking Forum (OIF), and is drawing attention as a main method for the future.

Figure 1:
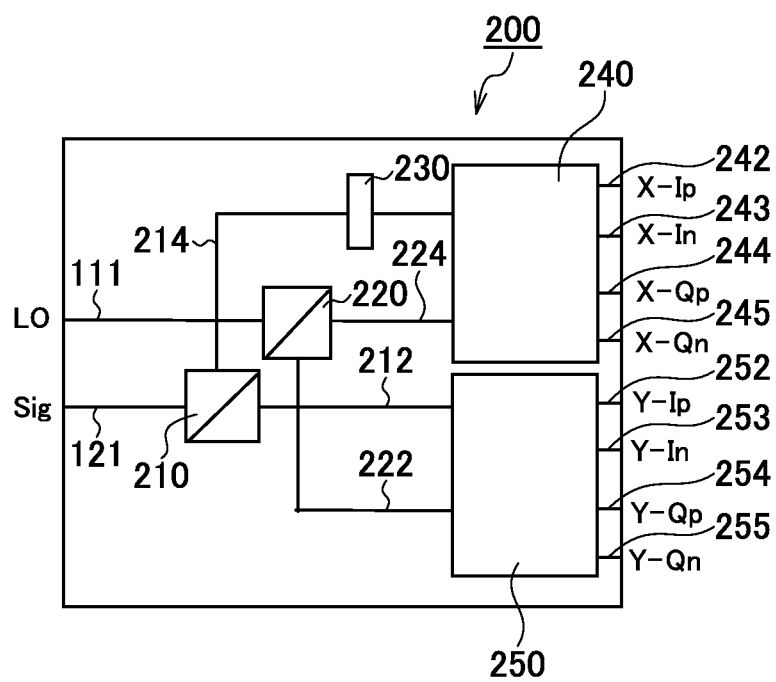
FIG. 1 is a schematic diagram to explain an example of a configuration of an optical circuit 200 of a DP-QPSK receiver section.

An example of a configuration of an optical circuit 200 of a DP-QPSK receiver section is illustrated in FIG. 1. In the present method, a polarization-multiplexed optical phase modulation signal beam (Sig) is polarization-beam-split by a Polarization Beam Splitter (PBS) 210. Optical signals for each of the polarized beam split polarization beams, and a local oscillator beam (LO) that is not modulated with substantially equal light frequency, are interfered using 90° hybrids 240, 250 to demodulate the phase signal to an intensity signal by differential reception. In the configuration of the 90° hybrids 240, 250 there is a need to accurately determine beam phase relationships, and a planar light-wave circuit (PLC) is suitable from the viewpoint of manufacturing ability. The optical circuit 200 of the present exemplary embodiment is configured as a Planar Light-wave Circuit (PLC).

The optical circuit 200 uses a mixer circuit for coherent reception, and amplifies the reception amplitude of the optical phase modulation signal beam (Sig) using the local oscillator beam (LO). Explanation follows regarding the optical circuit 200, with reference to FIG. 1 and FIG. 2.

The optical circuit 200 includes two waveguides 111 and 121 on the input side. The local oscillator beam (LO) is input to the waveguide 111, and the optical phase modulation signal beam (Sig) is input to the waveguide 121.

The optical phase modulation signal beam (Sig) input to the waveguide 121 is split by the Polarization Beam Splitter (PBS) 210 into an X polarization beam and a Y polarization beam. The light of the Y polarization beam is then transmitted by a waveguide 212, and the light of the X polarization beam is transmitted by a waveguide 214. The light of the Y polarization beam transmitted by the waveguide 212 is input to the 90° hybrid 250. The polarization plane of the light of the X polarization beam transmitted by the waveguide 214 is rotated by a rotator 230 to give light of a Y polarization beam, and then input to the 90° hybrid 240.

The local oscillator beam (LO) input to the waveguide 111 is, in this case, a Y polarization beam. The local oscillator beam (LO) input to the waveguide 111 is split into two by a 3 dB coupler 220, and transmitted by waveguides 222, 224. The light of the Y polarization beam transmitted by the waveguide 224 is input to the 90° hybrid 240. The light of the Y polarization beam transmitted by the waveguide 222 is input to the 90° hybrid 250.

The optical phase modulation signal beam (Sig) input to the 90° hybrid 240 is amplified by the local oscillator beam (LO) input to the 90° hybrid 240, to give beams of different phases every 90°. Beams X-Ip, X-In, X-Qp, X-Qn are then respectively output from the output side waveguides 242, 243, 244, 245.

The optical phase modulation signal beam (Sig) input to the 90° hybrid 250 is amplified by the local oscillator beam (LO) input to the 90° hybrid 250, to give beams of different phases every 90°. Beams Y-Ip, Y-In, Y-Qp, Y-Qn are then respectively output from the output side waveguides 252, 253, 254, 255.

Explanation next follows regarding structure and operation of the 90° hybrid 240. Note that the structure and operation of the 90° hybrid 250 is the same as that of the structure and operation of the 90° hybrid 240, and so explanation thereof is omitted.

Figure 2:
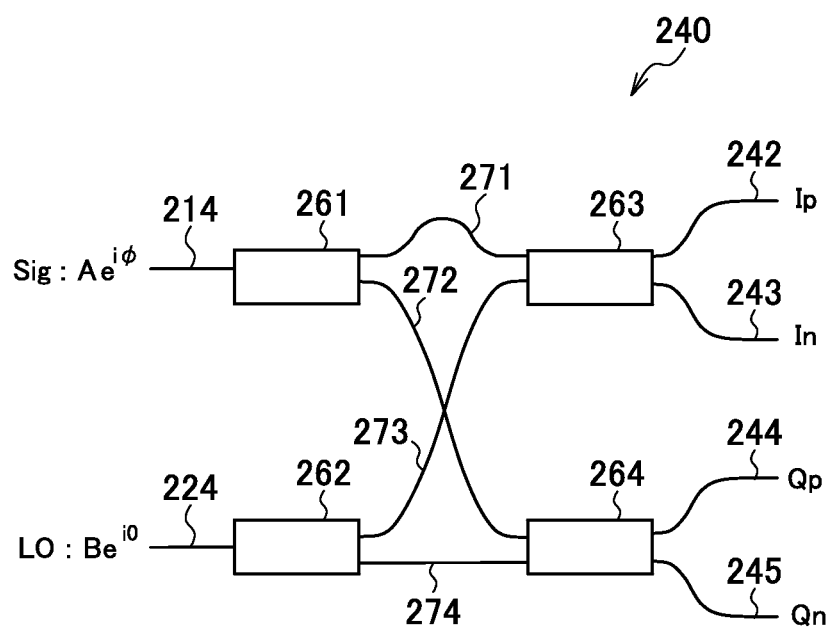
FIG. 2 is a diagram to explain structure and operation of the 90° hybrid 240 illustrated in FIG. 1.

FIG. 2 is a diagram to explain the structure and operation of the 90° hybrid 240 illustrated in FIG. 1. In the coherent reception mixer circuit the reception amplitude of the optical phase modulation signal beam (Sig) is amplified by the local oscillator beam (LO).

The optical phase modulation signal beam (Sig) from the waveguide 214 is split by a coupler 261, and a beam transmitted by a waveguide 271 is input to a coupler 263, and a beam transmitted by a waveguide 272 is input to a coupler 264. The waveguide 271 functions as a delay line.

The local oscillator beam (LO) from the waveguide 224 is split by a coupler 262, and a beam transmitted by a waveguide 273 is input to a coupler 263, and a beam transmitted by the waveguide 274 is input to a coupler 264.

The beam transmitted by the waveguide 271 and the beam transmitted by the waveguide 273 are mixed together in the coupler 263, and an Ip beam and an In beam are respectively output to the waveguide 242 and waveguide 243. The beam transmitted by the waveguide 272 and the beam transmitted by the waveguide 274 are mixed together in the coupler 264, and output, as a Qp beam and a Qn beam, to the waveguide 244 and the waveguide 245, respectively.

The amplitude of the optical phase modulation signal beam (Sig) is denoted A, the amplitude of the local oscillator beam (LO) is denoted B, the relative phase angle between the carrier wave of the optical phase modulation signal beam (Sig) and the carrier wave of the local oscillator beam (LO) is denoted $\phi$, the phase angle in the waveguide 271 is denoted $\theta$, and the phase rotation angle in the couplers 263, 264 is denoted $\xi$. The complex amplitude and beam intensities of the beams Ip, In, Qp, Qn respectively output by the waveguides 242, 243, 244, 245 are given by the following equations.

Complex Amplitude $$Ip: Ae^{(i(\phi+\theta))} + Be^{(i(\xi))} \qquad \text{Equation (1-1)}$$

$$In: Ae^{(i(\phi+\theta+\xi))} + Be^{(i(0))} \qquad \text{Equation (1-2)}$$

$$Qp: Ae^{(i(\phi))} + Be^{(i(\xi))} \qquad \text{Equation (1-3)}$$

$$Qn: Ae^{(i(\phi+\xi))} + Be^{(i(0))} \qquad \text{Equation (1-4)}$$

Light Intensity $$Ip: A^2 + B^2 + 2AB \cos(\phi+\theta-\xi) \qquad \text{Equation (2-1)}$$

$$In: A^2 + B^2 + 2AB \cos(\phi+\theta+\xi) \qquad \text{Equation (2-2)}$$

$$Qp: A^2 + B^2 + 2AB \cos(\phi-\xi) \qquad \text{Equation (2-3)}$$

$$Qn: A^2 + B^2 + 2AB \cos(\phi+\xi) \qquad \text{Equation (2-4)}$$

Taking the differential reception between the Ip and the In, and between the Qp and the Qn, gives I output and Q output according to the following equations.

$$I = Ip - In = 4AB \sin(\phi+\theta)\sin(\xi) \qquad \text{Equation (3-1)}$$

$$Q = Qp - Qn = 4AB \sin(100)\sin(\xi) \qquad \text{Equation (3-2)}$$

In the Equations (3-1) and (3-2), due to setting $\xi=90°$ and $\theta=90°$ in a 90° hybrid, the intensities of the I output and the Q output are given by the following equations.

$$I = Ip - In = 4AB \cos(\phi) \qquad \text{Equation (4-1)}$$

$$Q = Qp - Qn = 4AB \sin(\phi) \qquad \text{Equation (4-2)}$$

As indicated by Equations (4-1) and (4-2), it is clear that the signal output can be increased by increasing the amplitude B of the local oscillator beam, enabling an improvement in the signal noise ratio to be achieved.

Figure 3:
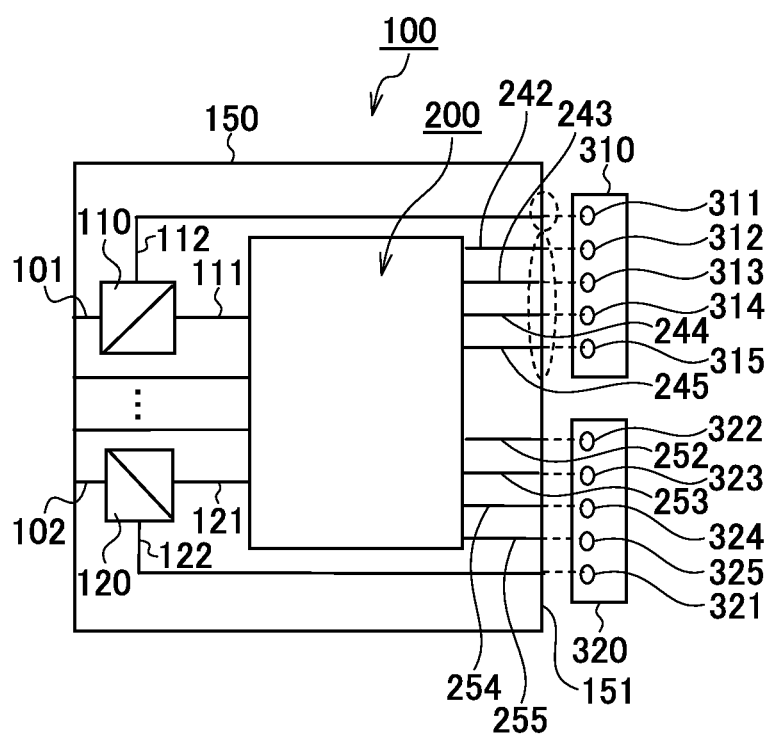
FIG. 3 is a schematic diagram to explain an optical receiver 100 of a preferable exemplary embodiment of technology disclosed herein.

Explanation next follows regarding an optical receiver 100 of a preferable exemplary embodiment of the technology disclosed herein, with reference to FIG. 3.

The optical receiver 100 of the present exemplary embodiment includes a planar light-wave circuit (PLC) 150, a light receiving device array 310, and a light receiving device array 320. The optical receiver 100 includes plural waveguides on the input side. In the present exemplary embodiment explanation is given of a case in which there are two waveguides 101, 102 present on the input side. The local oscillator beam (LO) is input to the waveguide 101, and the optical phase modulation signal beam (Sig) is input to the waveguide 102.

The local oscillator beam (LO) input to the waveguide 101 is split into two by a coupler 110. The beam propagating through the waveguide 111 is input to the above optical circuit 200, and the beam propagating through a waveguide 112 is employed as a monitoring beam. The optical phase modulation signal beam (Sig) input to the waveguide 102 is split into two by a coupler 120. The beam propagating through the waveguide 121 is input to the optical circuit 200, and the beam propagating through the waveguide 122 is employed as monitoring beam.

The beams X-Ip, X-In, X-Qp, X-Qn are respectively output from the waveguides 242, 243, 244, 245 on the output side of the optical circuit 200. The beams Y-Ip, Y-In, Y-Qp, Y-Qn are respectively output from the output side waveguides 252, 253, 254, 255. The monitoring beam of the local oscillator beam (LO) is output from the 112, and the monitoring beam of the optical phase modulation signal beam (Sig) is output from the waveguide 122.

The light receiving device array 310 includes light receiving devices 311 to 315. The light receiving device 311 is the light receiving device employed for the monitoring beam of the local oscillator beam (LO). The light receiving devices 312 to 315 are light receiving devices for receiving the signal beams respectively emitted from the waveguides 242, 243, 244, 245. The light receiving device 311 is provided facing toward the waveguide 112 that is exposed at an end face 151 of the planar light-wave circuit (PLC) 150. The light receiving devices 312 to 315 are respectively provided facing toward the waveguides 242, 243, 244, 245 that are exposed at the end face 151 of the planar light-wave circuit (PLC) 150. The light receiving devices 311 to 315 are integrally formed to the same substrate. The light receiving devices 311 to 315 are photodiodes.

The light receiving device array 320 includes light receiving devices 321 to 325. The light receiving device 321 is the light receiving device employed for the monitoring beam of the optical phase modulation signal beam (Sig). The light receiving devices 322 to 325 are light receiving devices for receiving the signal beams respectively emitted from the waveguides 252, 253, 254, 255. The light receiving device 321 is provided facing toward the waveguide 122 that is exposed at the end face 151 of the planar light-wave circuit (PLC) 150. The light receiving devices 322 to 325 are respectively provided facing toward the waveguides 252, 253, 254, 255 that are exposed at the end face 151 of the planar light-wave circuit (PLC) 150. The light receiving devices 321 to 325 are integrally formed to the same substrate. The light receiving devices 321 to 325 are photodiodes.

In the thus configured optical receiver 100, as control of the reception system, there is demand for a function to monitor the intensity of an input optical phase modulation signal, to detect signal interruption and as a parameter in demodulation. In order to miniaturize the device, to improve fiber yield, and to improve packaging properties, preferably such a monitoring function is built into the optical receiver 100. As stated above, monitoring of the optical input signal is performed by using the couplers 110, 120 and the like in the input waveguides 101, 102 to extract (branch) the beam. In such cases, the planar light-wave circuit (PLC) 150, the light receiving devices 312 to 315, 322 to 325 employed for signal reception, and the light receiving devices 311, 321 employed for monitoring beam detection, are preferably housed in the same case.

From the perspective of high speed signal reception, the beam reception diameter of the light receiving devices 312 to 315, 322 to 325 employed for signal reception is extremely small. For example, a beam reception diameter of about 15 μm to 25 μm is required to receive 100 Gigabit DP-QPSK transmissions (25 to 30 Gigabits baud rate), requiring high precision adjustment for beam coupling with output of the planar light-wave circuit (PLC) 150.

In the present exemplary embodiment, as indicated by Equations (4-1), (4-2), the signal output is increased by increasing the amplitude B of the local oscillator beam, reducing the relative thermal noise, enabling an improvement in signal noise ratio, and enabling an improvement in reception sensitivity. Thus a specification of the OIF anticipates cases in which the intensity of the local oscillator beam is a maximum of 34 dB greater than the intensity of the signal beam. However, making the intensity of the local oscillator beam as large as this leads to an unwanted increase in noise, due to such factors as stray light caused by the local oscillator beam.

In order to detect beam signal interruption, monitoring needs to detect beam intensity at levels further extracted from a smaller beam input than the minimum input intensity of the signal beam. If this setting value is denoted a dB, then when a monitoring light receiving device is housed in the same case, since stray light and the like caused by the local oscillator beam becomes a noise component of the light receiving device, isolation of 34 dB+α dB or greater needs to be secured between the local oscillator beam and the monitoring light receiving device.

One conceivable method to secure such a level of isolation is to make the monitoring beam reception diameter small. In such cases, although the required beam reception diameter depends on packaged state and the required setting value α, the setting value α is, for example, about 10 dB, and in consideration of inter-device variation, it is desirable to secure isolation of about 50 dB.

Figure 4:
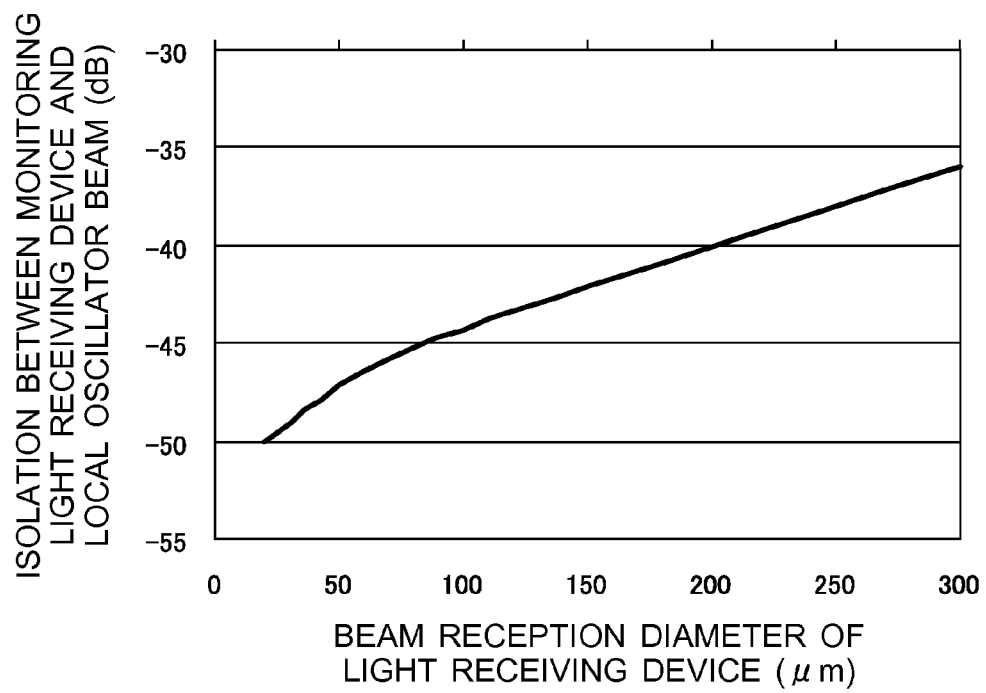
FIG. 4 is a diagram to explain a relationship in a DP-QPSK receptor between beam reception diameter of a light receiving device, and isolation between a monitoring beam light receiving device and a local oscillator beam.

FIG. 4 is a graph illustrating a relationship in a DP-QPSK receiver between the beam reception diameter of the light receiving devices, and the isolation between the monitoring light receiving device and the local oscillator beam. For example, a beam reception diameter of 20 μm or less is required in order to secure isolation of 50 dB or greater, this being a size that is substantially the same as the beam reception diameter of the light receiving device employed for signal beam reception.

Returning to FIG. 3, in the present exemplary embodiment, the light receiving device 311 that is a monitoring light receiving device, and the light receiving devices 312 to 315 that are signal beam-receiving light receiving devices, are integrally formed on the same substrate. The light receiving devices 311 to 315 are provided so as to respectively face toward the waveguides 112, 242 to 245 exposed at the end face 151 of the planar light-wave circuit 150. The relative positions of the waveguides 112, 242 to 245 are determined by the precision of process masks during manufacturing the waveguides 112, 242 to 245. The relative positions of the light receiving devices 312 to 315 are also determined by the precision of process masks during manufacturing the light receiving devices 312 to 315. Consequently, by determining the relative positions (beam coupling conditions) between the signal beam waveguides 242 to 245, and the signal beam light receiving devices 312 to 315, the positional relationship between the monitoring waveguide 112 and the monitoring light receiving device 311 is also adjusted at the same time, in an automatic determination. As a result, the need to adjust the monitoring waveguide 112 and the monitoring light receiving device 311 is eliminated, and coupling can be achieved with good precision between the monitoring waveguide 112 and the monitoring light receiving device 311. Consequently, the present exemplary embodiment enables positional alignment between the monitoring waveguide 112 and the monitoring light receiving device 311 to be performed simply and with good precision.

Moreover, the light receiving device 321 that is a light receiving device employed for a monitoring beam and the light receiving devices 322 to 325 that are light receiving devices employed for receiving signal beams are integrally formed on the same substrate. The light receiving devices 321 to 325 are provided so as to respectively face toward the waveguides 122, 252 to 255 exposed at the end face 151 of the planar light-wave circuit 150. The relative positions of the waveguides 122, 252 to 255 are determined by the precision of process masks during manufacturing the waveguides 122, 252 to 255. The relative positions of the light receiving devices 321 to 325 are also determined by the precision of process masks during manufacturing the light receiving devices 321 to 325. Consequently, by determining the relative positions (beam coupling conditions) between the signal beam waveguides 252 to 255, and the signal beam light receiving devices 322 to 325, the positional relationship between the monitoring waveguide 122 and the monitoring light receiving device 321 is also adjusted at the same time, in an automatic determination. As a result, the need to adjust the monitoring waveguide 122 and the monitoring light receiving device 321 is eliminated, and coupling can be achieved with good precision between the monitoring waveguide 122 and the monitoring light receiving device 321. Consequently, the present exemplary embodiment enables positional alignment between the monitoring waveguide 122 and the monitoring light receiving device 321 to be performed simply and with good precision.

Note that if the monitoring light receiving device 311 and the signal beam reception light receiving devices 312 to 315 are not integrally formed on the same substrate, then a need arises to separately determine the positional alignment between the monitoring waveguide 112 and the monitoring light receiving device 311. In such cases, a large packaging tolerance is permitted as long as the beam reception diameter of the monitoring light receiving device 311 is, for example, 300 μm or larger. This results in the ability to perform positional alignment between the monitoring waveguide 112 and the monitoring light receiving device 311 easily and at low cost. However, in the present exemplary embodiment, the beam reception diameter of the monitoring light receiving device 311 needs to be, for example, 30 μm or smaller, and preferably 20 μm or smaller. Such cases result in the need to adjust the positional alignment between the monitoring waveguide 112 and the monitoring light receiving device 311 with high precision, with an accompanying rise in the cost of the optical receiver 100.

Figure 5:
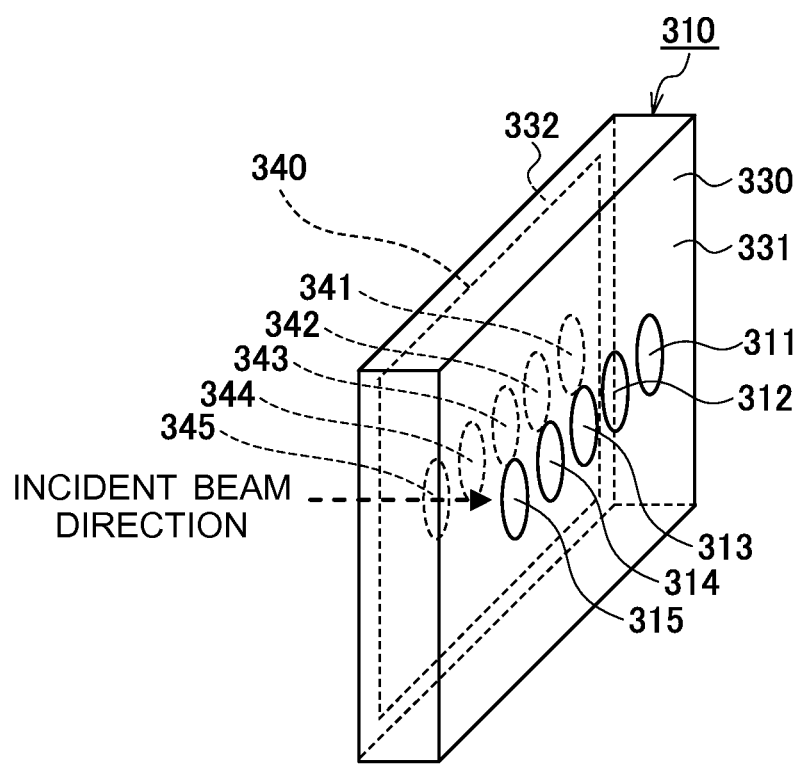
FIG. 5 is a schematic perspective view to explain a light receiving device array 310.

FIG. 5 is schematic perspective diagram to explain the light receiving device array 310. The light receiving device array 320 is configured the same as the light receiving device array 310 and so explanation thereof is omitted. A first main face 331 of a semiconductor substrate 330, such as InP, is selectively implanted with impurities to form the light receiving devices 311 to 315, such as photodiodes. A light-blocking mask 340 is provided on the other main face 332 of the semiconductor substrate 330, on the opposite side to that of the first main face 331. The beams from the waveguides 112, 242 to 245 are incident from the light-blocking mask 340 side. The light-blocking mask 340 is, for example, formed by providing transparent windows 341 to 345 in a gold film. The transparent windows 341 to 345 are provided so as to respectively face toward the light receiving devices 311 to 315. The size of each of the transparent windows 341 to 345 is about the same as the beam diameter that passes through to the light receiving devices 311 to 315 side, for example 30 μm or less. The characteristics of the light receiving devices 311 to 315 are advantageous in cases in which there is a side peak in peripheral sensitivity.

Note that a light receiving device array 310 that does not employ the light-blocking mask 340 may also be employed. In such cases, the beam reception diameter of the light receiving devices 311 to 315 is, for example, 30 μm or smaller. In such cases, the beams from the waveguides 112, 242 to 245 are made incident from the side of the light receiving devices 311 to 315.

Figure 6:
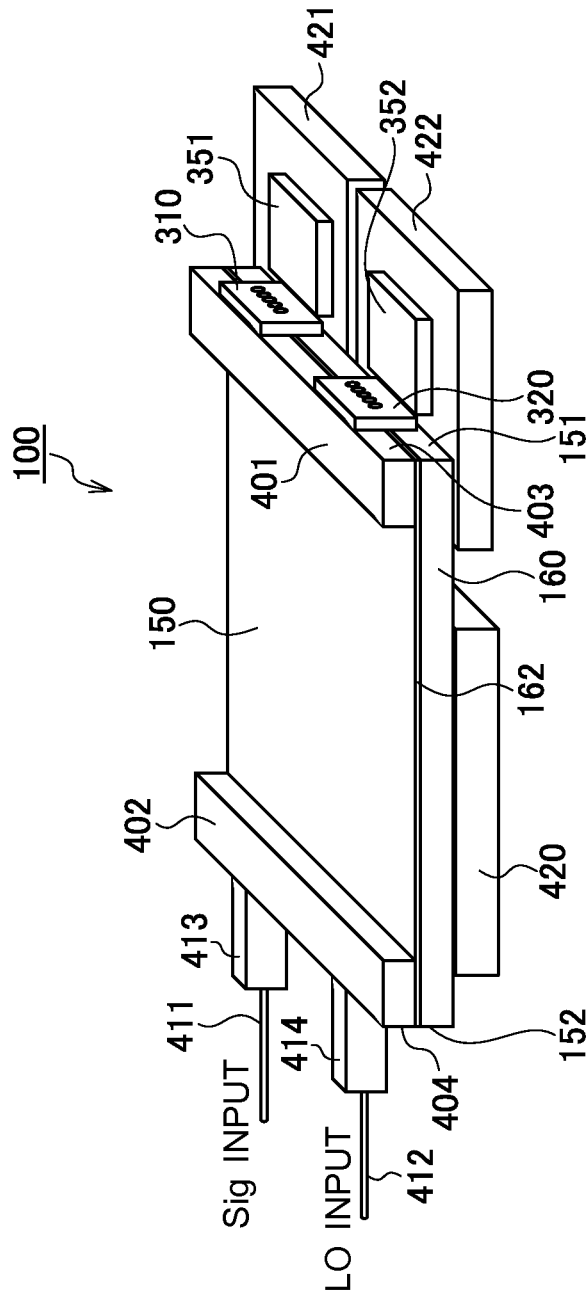
FIG. 6 is a schematic perspective view to explain an example of a coupling structure between a planar light-wave circuit 150 and light receiving device arrays 310, 320.

FIG. 6 is a schematic perspective view to explain an example of a coupling structure between the planar light-wave circuit (PLC) 150 and the light receiving device arrays 310, 320. The planar light-wave circuit (PLC) 150 includes a silicon substrate 160, and a $SiO_2$ layer 162 formed on the silicon substrate 160. Portions with a higher refractive index than $SiO_2$ is provided within the $SiO_2$ layer 162 to configure waveguides. The light receiving device arrays 310, 320 are fixed to the end face 151 of the planar light-wave circuit 150. A glass structural member 401 is employed on the planar light-wave circuit 150 during fixing. An end face 403 of the structural member 401 is in the same plane as the end face 151 of the planar light-wave circuit 150, and the light receiving device arrays 310, 320 are attached and fixed to the end face 151 of the planar light-wave circuit 150, and to the end face 403 of the structural member 401. This structure has few members employed to couple together the planar light-wave circuit (PLC) 150 and the light receiving device arrays 310, 320, and is advantageous cost-wise.

The light receiving device arrays 310, 320 employ photodiodes as light receiving devices. The light receiving device arrays 310, 320 accordingly have transimpedance amplifiers (TIA) 351, 352 respectively disposed immediately after the light receiving devices to convert current signals generated in the light receiving devices into voltage signals. The light receiving device arrays 310, 320 and the transimpedance amplifiers (TIA) 351, 352 are connected together, such as by gold wire, and it is accordingly important in high speed signal reception to suppress the parasitic capacity and inductance between the light receiving devices and the TIA by using such a placement.

In a DP-QPSK, due to treating four outputs as a single group for each polarization beam (see FIG. 1 to FIG. 3), it is effective to integrate together the respective four devices in order to suppress the variation in device characteristics between the light receiving devices and the transimpedance amplifiers corresponding to each of the outputs. Thus in the present exemplary embodiment, five individual light receiving devices are integrated together, the four individual light receiving devices corresponding to the four outputs for each polarization beam and the monitoring light receiving device, to make up the smallest unit.

Note that structural members 412, 422 are fixed to the bottom face on the end face 151 side of the planar light-wave circuit 150. The transimpedance amplifiers 351, 352 are respectively fixed to the structural members 412, 422. The structural members 412, 422 are employed as height adjustment members during fixing of the transimpedance amplifiers 351, 352.

A structural member 420 is fixed to the bottom face of the planar light-wave circuit 150. The structural member 420 is employed as a height adjusting member during fixing of the planar light-wave circuit 150. Optical fibers 411, 412 are fixed to an end face 152, on the opposite side of the end face 151 side of the planar light-wave circuit 150, with fiber fixing members 413, 414 interposed therebetween. A glass structural member 402 is employed on the planar light-wave circuit 150. An end face 404 of the structural member 402 is set in the same plane as the end face 152 of the planar light-wave circuit 150, and is employed as a support member when attaching the fiber fixing members 413, 414.

Figure 7:
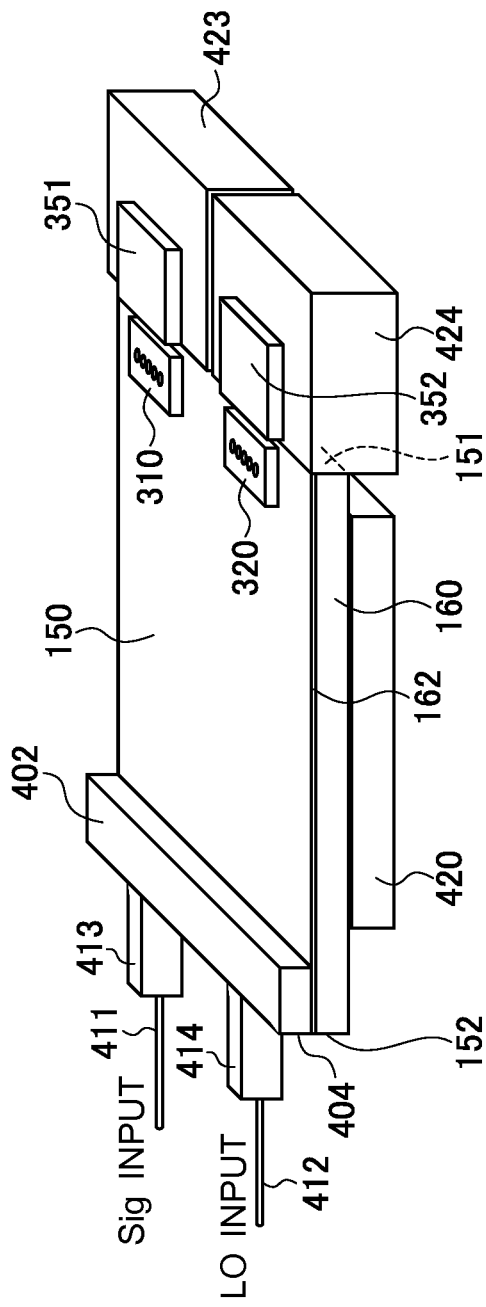
FIG. 7 is a schematic perspective view to explain another example of a coupling structure between a planar light-wave circuit 150 and light receiving device arrays 310, 320.

FIG. 7 is a schematic perspective view to explain another example of a coupling structure between the planar light-wave circuit (PLC) 150 and the light receiving device arrays 310, 320. In the structure of FIG. 6, the light receiving device arrays 310, 320 are fixed to the end face 151 of the planar light-wave circuit 150. In contrast thereto, in the structure of FIG. 7, the light receiving device arrays 310, 320 are attached to the top face of the planar light-wave circuit 150, with the top faces of the light receiving device arrays 310, 320 and the top faces of the transimpedance amplifiers 351, 352 set in the same plane as each other. Other points regarding the structure of FIG. 7 are the same as those of the structure of FIG. 6. Setting the top faces of the light receiving device arrays 310, 320 and the top faces of the transimpedance amplifiers 351, 352 in the same plane as each other facilitates connection between the light receiving device arrays 310, 320 and the transimpedance amplifiers (TIA) 351, 352, such as by gold wire. Note that the output beam of the planar light-wave circuit 150 needs to face the top face of the planar light-wave circuit 150 in the vicinity of the end face 151 in order to attach the light receiving device arrays 310, 320 to the top face of the planar light-wave circuit 150. Thus, for example, fabrication, such as providing an up-throwing mirror, is performed in the vicinity of the end face 151 of the planar light-wave circuit 150. Structural members 423, 424 are fixed to the end face 151 of the planar light-wave circuit 150, the transimpedance amplifiers 351, 352 are respectively attached on the structural members 423, 424, and height adjustment is performed during fixing of the transimpedance amplifiers 351, 352.

Figure 8:
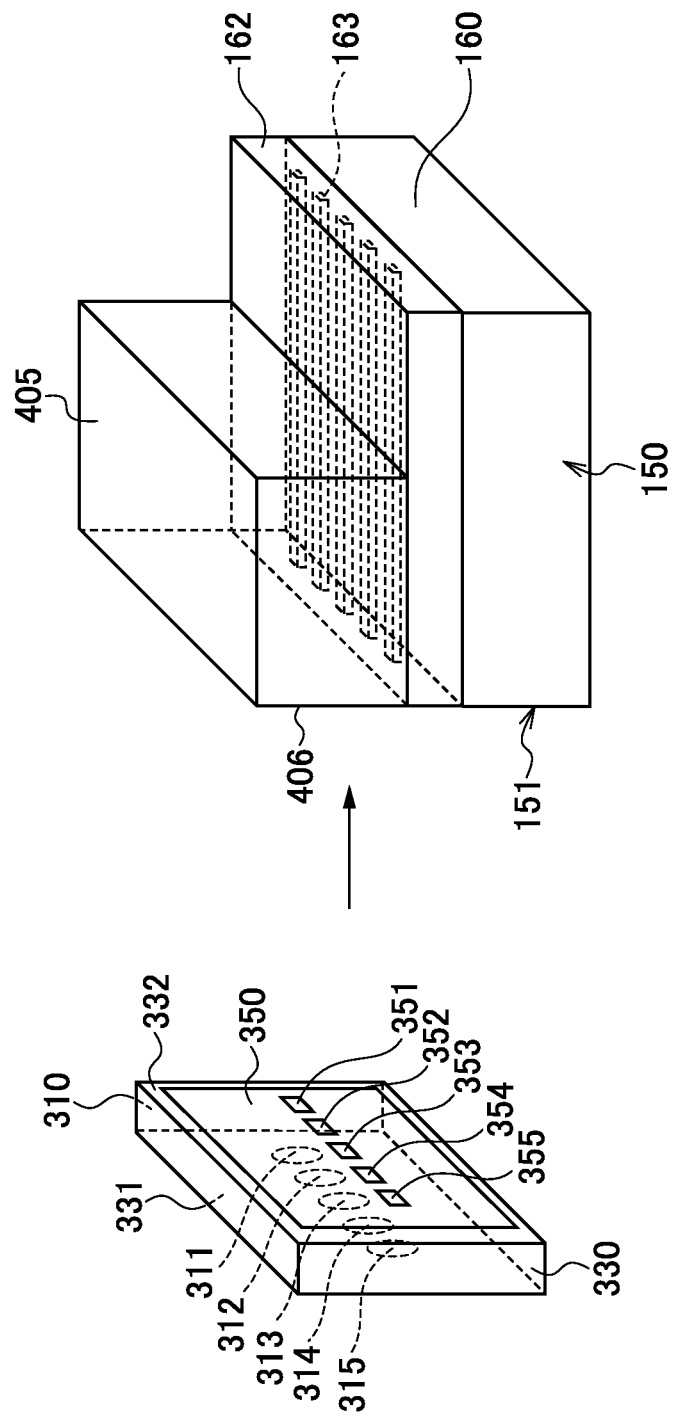
FIG. 8 is a schematic perspective view to explain yet another example of a coupling structure between a planar light-wave circuit 150 and light receiving device arrays 310, 320.

FIG. 8 is a schematic perspective view to explain yet another example of a coupling structure between the planar light-wave circuit 150 and the light receiving device array 310 (320). The positional alignment between the light receiving devices and the planar waveguides needs to be at a precision of several microns or higher. In order to achieve positional alignment precision of this order, in the coupling structure in FIG. 6 and FIG. 7, normally electrical connection is made to the light receiving devices, such as by probe, the photoelectric current monitored, and the light receiving device arrays 310, 320 fixed where the photoelectric current is greatest, however the procedures and equipment involved are complicated. In the coupling structure of the present example, it is possible to implement positional alignment between the light receiving devices and the planar light-wave circuit without electrical connection to the light receiving devices.

A planar light-wave circuit 150 includes a silicon substrate 160, and a $SiO_2$ layer 162 serving as a cladding layer formed on the silicon substrate 160. Waveguide cores 163 are provided in the $SiO_2$ layer 162 with a refractive index higher than that of $SiO_2$. The light receiving device array 310 is fixed to an end face 151 of the planar light-wave circuit 150. A glass structural member 405 is employed on the planar light-wave circuit 150. An end face 406 of the structural member 405 is set in the same plane as the end face 151 of the planar light-wave circuit 150, and the light receiving device array 310 is attached and fixed to the end face 151 of the planar light-wave circuit 150 and the end face 406 of the structural member 405.

In the light receiving device array 310, light receiving devices 311 to 315, such as photodiodes, are formed by selectively implanting impurities into a first main face 331 of a semiconductor substrate 330, such as InP. A reflective light blocking mask 350 is then provided to the other main face 332 of the semiconductor substrate 330, on the opposite side to the first main face 331. Apertures 351 to 355, serving as transparent windows, are provided in the reflective light blocking mask 350 so as to align with the waveguide cores 163. The size of the apertures 351 to 355 is substantially the same as the cross-sectional area of the waveguide core 163. The apertures 351 to 355 are respectively provided so as to face the light receiving devices 311 to 315.

Figure 9:
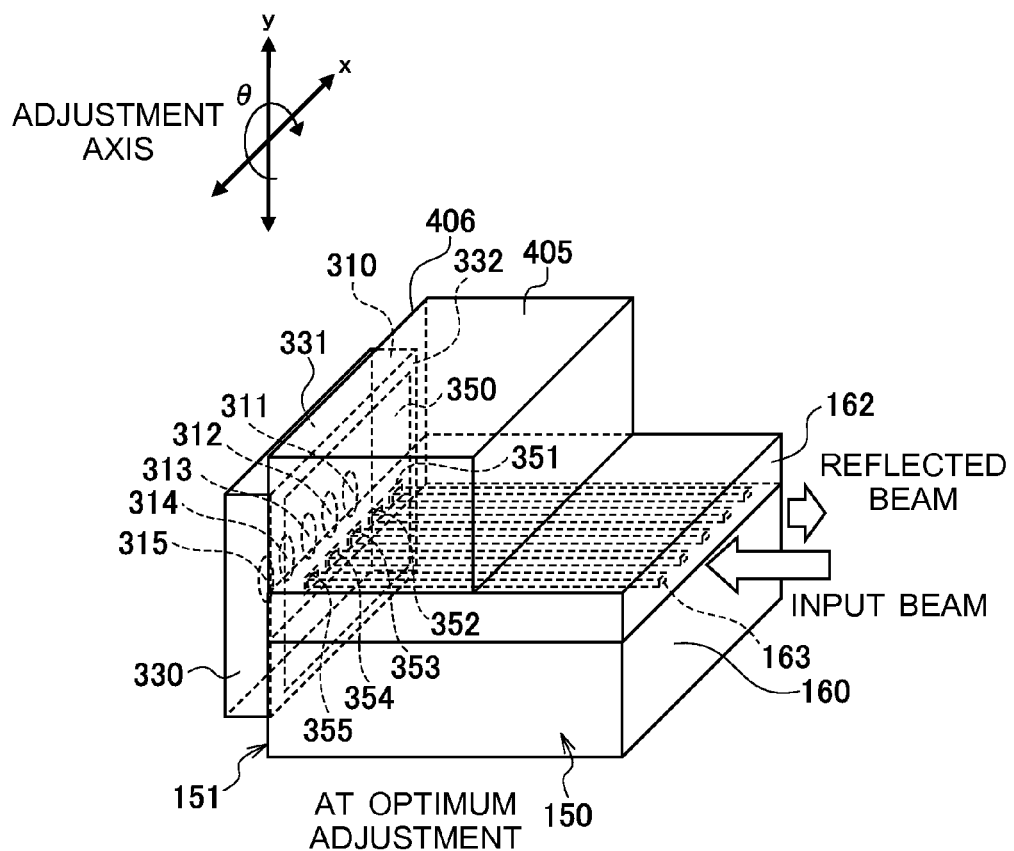
FIG. 9 is a schematic perspective view to explain positional alignment of a planar light-wave circuit 150 and a light receiving device array 310.
Figure 10:
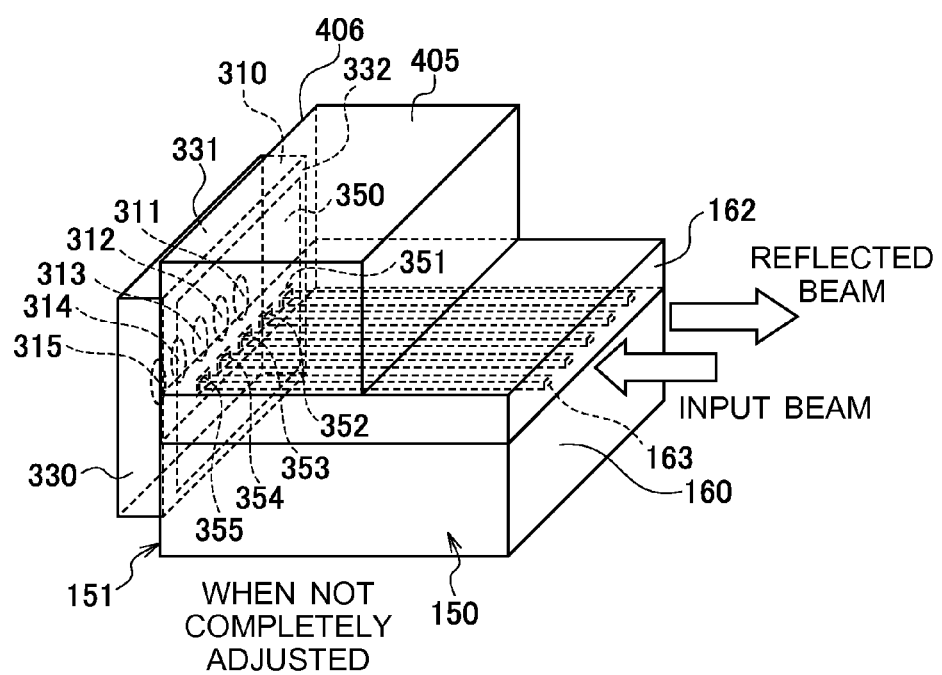
FIG. 10 is a schematic perspective view to explain positional alignment of a planar light-wave circuit 150 and a light receiving device array 310.

The positional alignment precision between the light receiving devices 311 to 315 side and the reflective light blocking mask 350 side is of the order of a few microns, according to the precision of the processing device employed to produce the light receiving devices 311 to 315. In such a case, the intensity of the reflected beam is low when the positions of the apertures 351 to 355 are aligned with respect to the waveguide core 163, as illustrated in FIG. 9, and the intensity of the reflected beam is high when the positions of the apertures 351 to 355 are not aligned with respect to the waveguide core 163, as illustrated in FIG. 10. Thus the relationship between the intensity of the reflected beam and the coupling state enables positional alignment to be implemented between the light receiving devices 311 to 315 and the waveguide cores 163 without electrical connection to the light receiving devices 311 to 315. Note that the positional alignment is performed in the X axis, the Y axis and by rotation ($\theta$).

Figure 11:
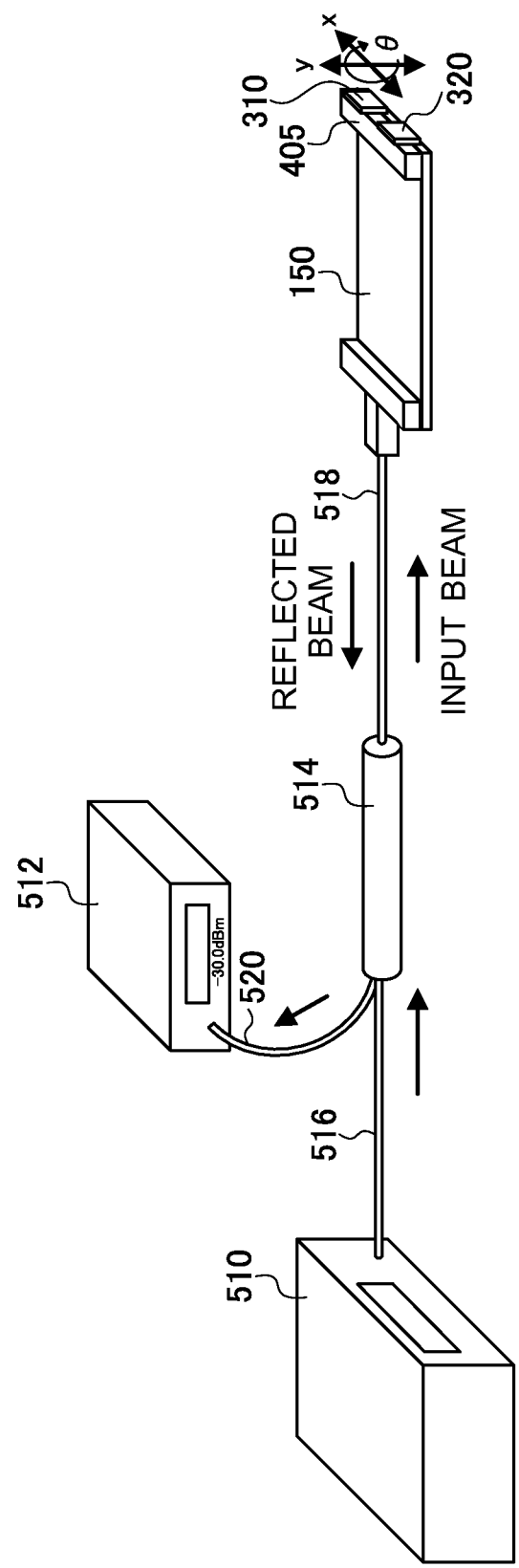
FIG. 11 is a schematic view to explain a measurement system employed in positional alignment of a planar light-wave circuit 150 and a light receiving device array 310.

FIG. 11 is a schematic diagram illustrating a measurement system employed in such positional alignment. A beam from a light source 510 is made incident to the planar light-wave circuit 150 through an optical fiber 516, an optical circulator 514, and an optical fiber 518. The beam is then reflected by the reflective light blocking mask 350 provided to the light receiving device array 310, and made incident to an optical power meter 512 through the optical circulator 514 and an optical fiber 520. The intensity of the reflected light is measured by the optical power meter 512.

Figure 12:
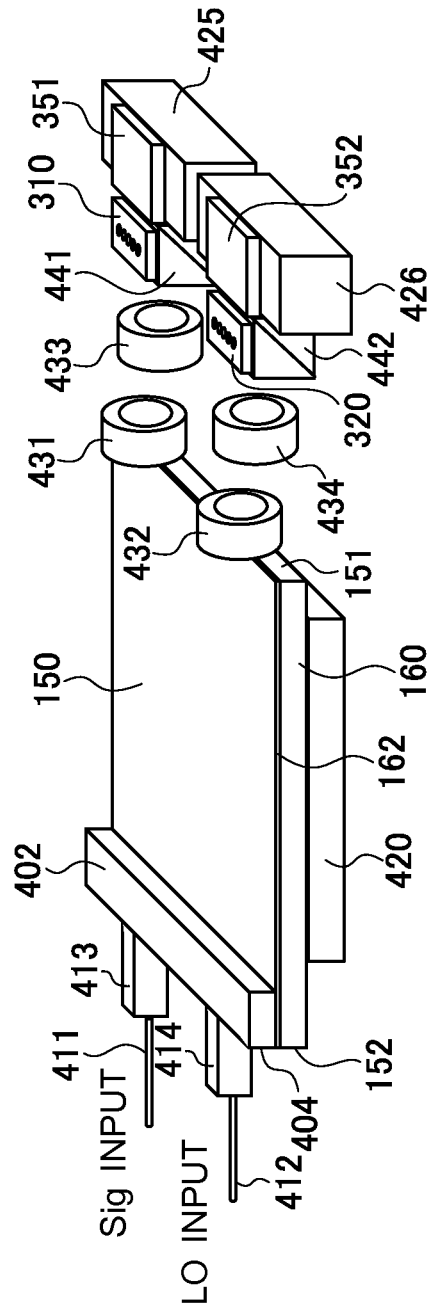
FIG. 12 is a schematic perspective view to explain yet another example of a coupling structure between a planar light-wave circuit 150 and light receiving device arrays 310, 320.

FIG. 12 is a schematic perspective view to explain yet another coupling structure between a planar light-wave circuit 150 and light receiving device arrays 310, 320. In the structure of FIG. 6, the light receiving device arrays 310, 320 are attached to the end face 151 of the planar light-wave circuit 150, and in the structure of FIG. 7 the light receiving device arrays 310, 320 are attached to the top face of the planar light-wave circuit 150. In contrast thereto, in the structure of FIG. 12, the planar light-wave circuit 150 and the light receiving device arrays 310, 320 are coupled together by lenses 431 to 434.

The light emitted from the end face 151 of the planar light-wave circuit 150 is made incident to a bending optical system 441 through the lenses 431 to 433, the beams are bent toward the top face by the bending optical system 441, and made incident to the back face side of the light receiving device array 310. The light emitted from the end face 151 of the planar light-wave circuit 150 is made incident to a bending optical system 442 through the lenses 432, 434, the beams are bent toward the top face by the bending optical system 442, and made incident to the back face side of the light receiving device array 320.

The transimpedance amplifiers 351, 352 are respectively attached on structural members 425, 426, and height adjustment is performed during fixing of the transimpedance amplifiers 351, 352. Connection is thereby facilitated between the light receiving device arrays 310, 320 and the transimpedance amplifiers 351, 352, such as by gold wire.

In lens coupling, in contrast to the configurations of FIG. 6 and FIG. 7, it is possible to adjust coupling while monitoring the light reception intensity, and lens coupling is applicable in cases that require even smaller beam reception diameters. In this example, the bending optical systems 441, 442 are employed in front of the light receiving device arrays 310, 320 to apply lens coupling, however the bending optical systems 441, 442 are redundant in cases in which beams are received by the light receiving device arrays 310, 320 from an end face (chip side face).

Figure 13:
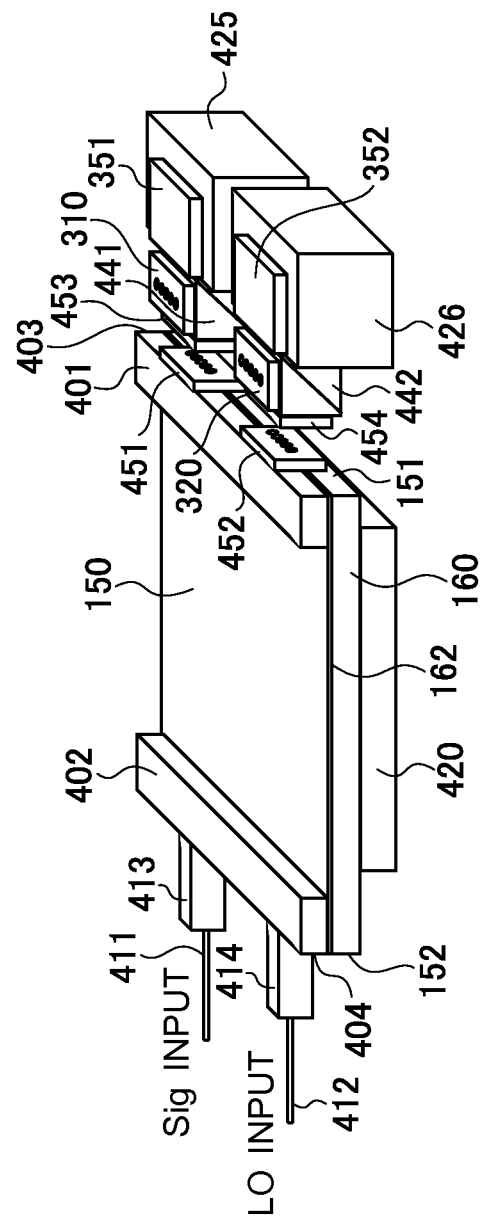
FIG. 13 is a schematic perspective view to explain yet another example of a coupling structure between a planar light-wave circuit 150 and light receiving device arrays 310, 320.

FIG. 13 is a schematic perspective diagram to explain yet another example of a coupling structure between the planar light-wave circuit 150 and the light receiving device arrays 310, 320. In the structure of FIG. 12, the planar light-wave circuit 150 and the light receiving device arrays 310, 320 are coupled together by the lenses 431 to 434. In contrast thereto, in the structure of FIG. 13, the planar light-wave circuit 150 and the light receiving device arrays 310, 320 are coupled together by microlens arrays 451 to 454.

The microlens arrays 451, 452 are fixed to the end face 151 of the planar light-wave circuit 150. A glass structural member 401 is employed on the planar light-wave circuit 150. An end face 403 of the structural member 401 is set in the same plane as the end face 151 of the planar light-wave circuit 150, and the microlens arrays 451, 452 are attached and fixed to the end face 151 of the planar light-wave circuit 150 and the end face 403 of the structural member 401.

The microlens array 453 is attached to the side face of the bending optical system 441, and the light receiving device array 310 is attached to the top face of the bending optical system 441. The microlens array 454 is attached to the side face of the bending optical system 442, and the light receiving device array 320 is attached to the top face of the bending optical system 442. The light emitted from the end face 151 of the planar light-wave circuit 150 is made incident to the bending optical system 441 through the microlens arrays 451, 453, the beams are bent toward the top face by the bending optical system 441, and made incident to the light receiving device array 310 from the back face side. The light emitted from the end face 151 of the planar light-wave circuit 150 is made incident to the bending optical system 442 through the microlens arrays 452, 454, the beams are bent toward the top face by the bending optical system 442, and made incident to the light receiving device array 320 from the back face side.

The transimpedance amplifiers 351, 352 are respectively attached to structural members 425, 426, and height adjustment is performed during fixing of the transimpedance amplifiers 351, 352. Connection is thereby facilitated between the light receiving device arrays 310, 320 and the transimpedance amplifiers 351, 352, such as by gold wire.

In the present example, explanation has been given of a two lens optical system with high flexibility for adjustment, however implementation may be using a single lens optical system.

Figure 14:
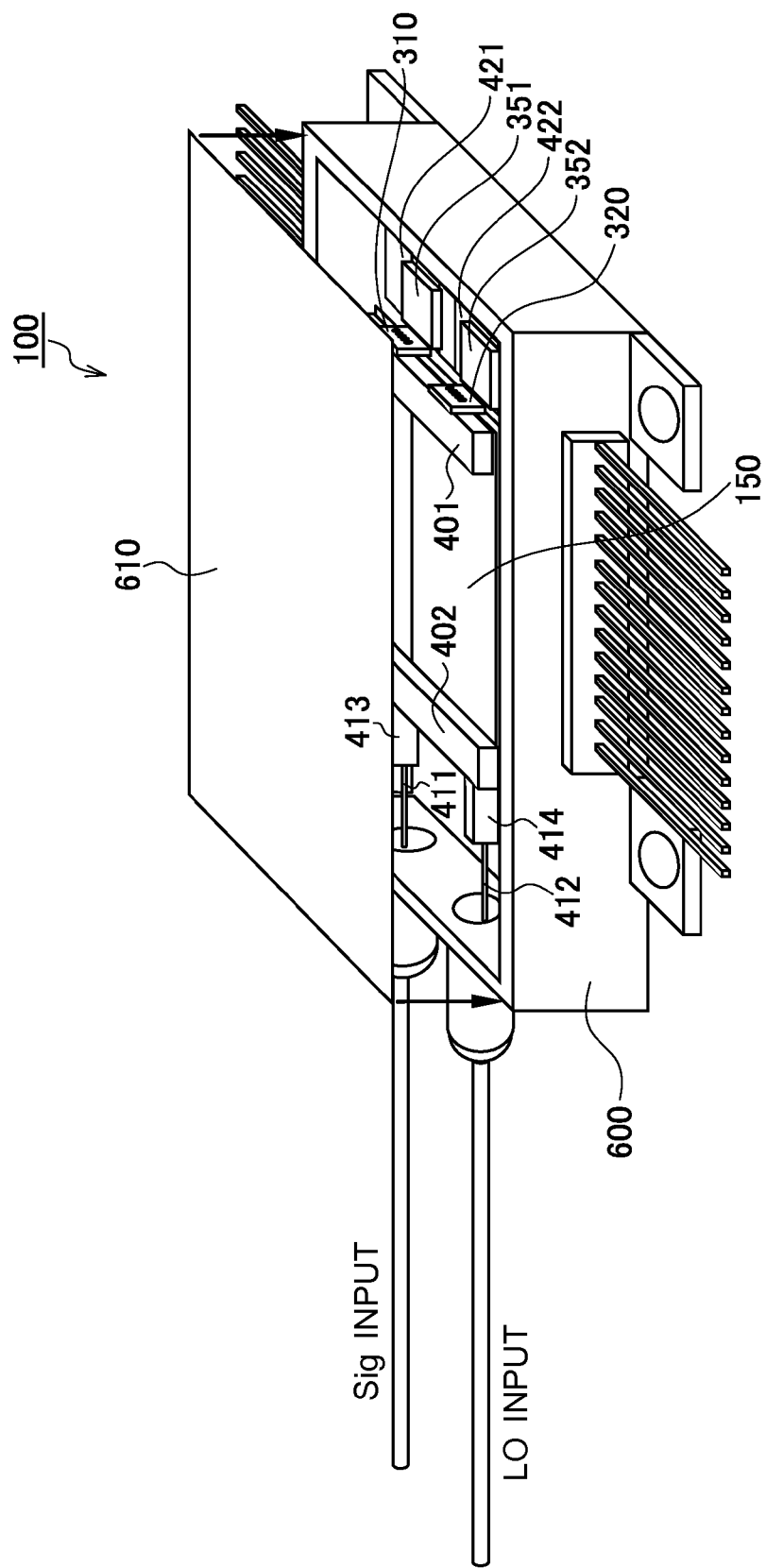
FIG. 14 is a schematic perspective view to explain yet another example of a coupling structure between a planar light-wave circuit 150 and light receiving device arrays 310, 320.

FIG. 14 is a schematic perspective view to yet explain another example of a coupling structure between the planar light-wave circuit 150 and the light receiving device arrays 310, 320. In the sealed structure of FIG. 14, the planar light-wave circuit 150, the light receiving device arrays 310, 320, and the transimpedance amplifiers 351, 352 are all housed in the same case 600. A lid (top) 610 is attached to the case 600 to give a sealed structure. The present structure enables a more compact device to be achieved overall, without having separate individual cases for each of the elements. Note that the structure of FIG. 14 is the structure of FIG. 6, housed in the case 600, however any of the structures from FIG. 7 to FIG. 13 may also be employed as the structure housed in the case 600.

The above optical waveguides may be configured by any of a quartz-based, silicon-based, InP-based, LiNO$_3$-based, resin-based optical waveguide, or the like, and is not limited by waveguide configuration material. Although a single core fiber connection input is employed for the optical phase modulation signal beam (Sig) and the local oscillator beam (LO), micro-optics using a multi-core fiber array, lenses etc. may be employed, and the coupling method is not limited.

The above optical receiver 100 is preferably employed in an optical transmission device provided with the optical receiver 100.

As explained above, the technology disclosed herein enables necessary monitoring operations to be implemented without increasing the effort to package the monitoring light receiving devices.

All publication, patent applications and technical standards mentioned in the present specification are incorporated by reference in the present specification to the same extent as if the individual publication, patent application, or technical standard was specifically and individually indicated to be incorporated by reference.

Various typical exemplary embodiments have been illustrated and explained above, however the present invention is not limited by these exemplary embodiments. The scope of the present invention is only limited by the scope of the following claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical receiver comprising:
   a waveguide substrate including a first waveguide that transmits a main signal beam, a coupler that splits the main signal beam and generates a monitoring beam, a second waveguide that transmits the monitoring beam, a third waveguide that transmits a local oscillator beam, and an optical circuit that outputs an output beam that is mixed with the main signal beam and the local oscillator beam;
   a light receiving device array, integrally formed to a single substrate that is different from the waveguide substrate, including a first light receiving device that detects the output beam and a second light receiving device that detects the monitoring beam; and
   a case that houses the waveguide substrate and the light receiving device array.

2. The optical receiver of claim 1, wherein a plurality of the first light receiving devices to detect the output beam, and the second light receiving device to detect the monitoring beam, are integrally formed to the single substrate that is different from the waveguide substrate.

3. The optical receiver of claim 1, wherein four or more of the first light receiving devices to detect the output beam, and the second light receiving device to detect the monitoring beam, are integrally formed to the single substrate that is different from the waveguide substrate.

4. The optical receiver of claim 1, wherein a diameter of a light receiving portion that receives the monitoring beam in the second light receiving device is 30 μm or smaller.

5. The optical receiver of claim 1, wherein the light receiving device array includes, on a surface side where the output beam and the monitoring beam are incident, a light blocking portion provided with transparent windows of equivalent size to the transmission beam diameters.

6. The optical receiver of claim 1, wherein the waveguide substrate includes a mixer circuit for coherent reception.

7. The optical receiver of claim 1, wherein the first light receiving device and the first waveguide end are optically coupled through a first lens, and the second light receiving device and the second waveguide end are optically coupled through a second lens.

8. The optical receiver of claim 1, wherein the waveguide substrate and the light receiving device array are sealed within the case.

* * * * *